US006829783B1

(12) United States Patent
Fegesh

(10) Patent No.: US 6,829,783 B1
(45) Date of Patent: Dec. 7, 2004

(54) ARRANGEMENT FOR PRODUCING TELEVISION CONTRIBUTIONS

(75) Inventor: Henrik Fegesh, Darmstadt (DE)

(73) Assignee: Thomson Licensing, S.A., Boulogne-Billancourt (FR)

( * ) Notice: Subject to any disclaimer, the term of this patent is extended or adjusted under 35 U.S.C. 154(b) by 1415 days.

(21) Appl. No.: 08/876,450

(22) Filed: Jun. 16, 1997

(30) Foreign Application Priority Data

Jun. 28, 1996 (DE) ........................................ 196 25 953

(51) Int. Cl.⁷ .............................................. H04N 5/268
(52) U.S. Cl. ...................................... 725/705; 725/722
(58) Field of Search .................................. 348/722, 721, 348/578, 705, 706, 584; H04N 5/222, 9/64, 9/74

(56) References Cited

U.S. PATENT DOCUMENTS

| 4,700,230 A | | 10/1987 | Pshtissky et al. ............ 358/181 |
| 4,991,019 A | * | 2/1991 | Enami et al. ................ 348/722 |
| 5,001,473 A | * | 3/1991 | Ritter et al. ................. 348/722 |
| 5,060,068 A | * | 10/1991 | Lindstrom ................... 348/722 |
| 5,099,319 A | * | 3/1992 | Esch et al. .................. 348/722 |
| 5,115,426 A | * | 5/1992 | Spanke ....................... 348/705 |
| 5,285,283 A | * | 2/1994 | Fairhurst et al. ............ 348/705 |
| 5,446,866 A | * | 8/1995 | Drako et al. ................ 395/500 |
| 5,579,060 A | * | 11/1996 | Elberbaum ................... 348/705 |
| 5,598,208 A | * | 1/1997 | McClintock ................. 348/705 |

* cited by examiner

Primary Examiner—Vivek Srivastava
(74) Attorney, Agent, or Firm—Joseph S. Tripoli; Harvey D. Fried; Francis A. Davenport

(57) ABSTRACT

An arrangement for producing television contributions in a studio or in a mobile unit, including at least one picture signal source (19 to 22), devices (11 to 17) for processing the picture signals, and outputs (23 to 26) for the processed picture signals. To simplify elaborate constructions, wiring and reconstruction, the arrangement accomodates the individual picture signal-processing devices (11 to 17) as independent units in a central operation unit (10) and connects the inputs and outputs of the picture signal-processing devices (11 to 17) to a controllable switching device (18) enabling free allocation of the picture signal-processing devices (11 to 17).

6 Claims, 2 Drawing Sheets

ARRANGEMENT FOR PRODUCING TELEVISION CONTRIBUTIONS

BACKGROUND OF THE INVENTION

1. Field of the Invention

The invention relates to an arrangement for producing television contributions in a studio or in a mobile unit, comprising at least one picture signal source, devices for processing the picture signals, and outputs for the processed picture signals.

To produce television contributions, a plurality of picture signal sources are generally available simultaneously. To select given picture signal sources from the multitude of such sources and process picture signals in accordance with artistic viewpoints, several devices for processing the picture signals are provided in a television studio or in a mobile unit, such as, for example devices for switching, mixing, synchronization, correction, alienating and storing the picture signals. The different picture signal sources and picture signal-processing devices are generally interconnected by means of elaborate cable systems. The picture signal sources which are available are, for example, cameras, magnetic tape recorders, external inputs or other sources. The picture signals processed by the picture signal-processing devices are applied via outputs to, for example, transmission lines, monitors or other consumers.

For example, a mobile unit which is ready for operation is built up in accordance with the customer's wishes and comprises, for example, the above-mentioned picture signal-processing devices which are fixedly wired together. The different broadcast stations generally have separate wishes which depend on the purposes for which such a mobile unit should be predominantly used. Examples are sports events, scenic films, concerts, talk shows, political events or the like. Dependent on the desired purpose, certain cameras and processing devices which are fixedly or detachably wired together are then provided in accordance with the customer's wishes. When, for example, such a mobile unit, intended for sports events, is to be used for another purpose, costly and elaborate reconstructions are generally necessary.

2. Description of the Related Art

A modular video switching system is known from U.S. Pat. No. 4,700,230. This is a camera-monitor system with a plurality of cameras and one monitor, in which the cameras are switched to the monitor via a box. Each module comprises a limited number of input channels. The modules can be interconnected in such a way that the video signals of all modules are displayed on the monitor. A measuring device evaluates the camera signals.

SUMMARY OF THE INVENTION

It is an object of the invention to provide an arrangement of the type described in the opening paragraph in such a way that it has a simple construction and cable system and that a reconstruction can be easily realized.

According to the invention, in an arrangement of the type described in the opening paragraph, this object is solved in that the individual picture signal-processing devices are accommodated as independent units in a central operation unit, and the inputs and outputs of the picture signal-processing devices are connected to a controllable switching device enabling free allocation of the picture signal-processing devices.

This yields a flexible system for producing television contributions, which is not restricted by a fixed, decentralized cable system. With such an arrangement, the picture signal sources and picture signal-processing devices in a television studio or a mobile unit can be adapted easily and without problems to the personal wishes of a production manager and/or operator, for example, an artist. Independent of a cable system, picture signal-processing devices which are present and available can be freely configured and thus utilized optimally. Before the start of a production process, the operator sets the switching device in such a way that the processing devices required for the production process in question are available. Processing devices which are present in the operation unit but are not required for this production process can then be configured for other productions and thus used simultaneously. In addition to said advantages, a smaller space and much less elaborate wiring is required, and it is particularly possible to realize changes rapidly and without any problem. The manufacturer of such a mobile unit can react much more quickly to the customer's wishes and provide tailor-made offers. Moreover, an elaborate planning for accommodating the individual operation components and the cable system will be superfluous. Furthermore, the usual problems of dissipating heat or of cooling are then essentially obviated. This leads to a flexible control system with a freely configurable signal routing. A customer could also individually determine and compose the types and numbers of the separate devices in the operation unit, for example, the complete system with mixers and system periphery, without this leading to an elaborate planning and implementation.

According to the invention, the switching device is controllable by means of control software. Such an implementation of the controllable switching device provides great flexibility, because the required picture signal-processing devices can be selected and interconnected very rapidly and without elaborate operations.

In accordance with a further aspect of the invention, the inputs and outputs of the picture signal-processing devices are connected to inputs and outputs of a computer-controlled crossbar. Such a construction provides a convenient connection between the picture signal-processing devices and the switching device.

Another embodiment of the invention is characterized in that the picture signal-processing devices and the switching device are accommodated in a production box arranged centrally in the studio or the mobile unit. Such a construction renders a compact system possible. The production box may be provided with all devices required for such arrangements for producing television contributions, while free spaces may be provided to extend the arrangement with, then still unknown, components at a later stage.

A simple construction of the production box and a simple possibility of connecting it to the switching device is provided in that the picture signal-processing devices are implemented as fixedly wired slide-in units which are slidable into the production box and connectable to the controllable switching device via slide-in contacts or software modules.

An advantageous embodiment of the invention is characterized in that the picture signal-processing devices selected for a given purpose by means of the controllable switching device are controllable by means of one or more control desks having freely configurable control surfaces. The often inconveniently large control desk having a multitude of knobs and switches provided for the arrangements hitherto known is thus not needed. The freely configurable control surfaces of the control desks now provided may be allocated and adapted to given groups of processing devices.

These and other aspects of the invention are apparent from and will be elucidated with reference to the embodiments described hereinafter.

DESCRIPTION OF THE PREFERRED EMBODIMENT

Figure 1:
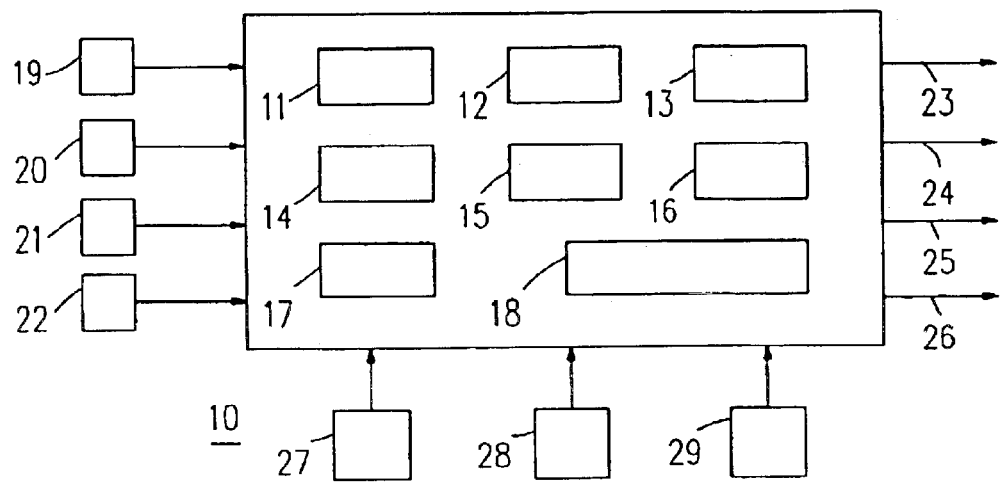
FIG. 1 is a block diagram of the overall construction of an arrangement according to the invention.
Figure 3:
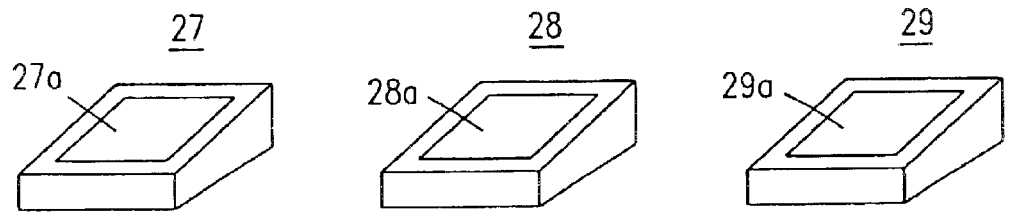
FIG. 3 is a perspective view of three control desks.

FIG. 1 shows a central operation or production unit 10 accommodating picture signal-processing devices 11 to 17. In the embodiment shown, the production unit 10 comprises, for example mixer stages 11, keys 12, digital video effect devices 13, script generators 14, video stores 15 (for example, fixed-head discs), synchronizers 16, a free housing 17 still unoccupied with components, and a controllable switching device 18 for the above-mentioned picture signal-processing devices 11 to 17. Two cameras 19 and 20 and two magnetic tape recorders 21 and 22 serve as picture signal sources in this case. The reference numerals 23 and 24 denote two antenna signal outputs, and 25 and 26 denote two monitor signal outputs. Moreover, three control desks 27, 28 and 29, shown in FIG. 3 are connected to the production unit 10, each desk having a freely configurable control surface 27a, 28a, and 29a shown in FIG. 3.

Figure 2:
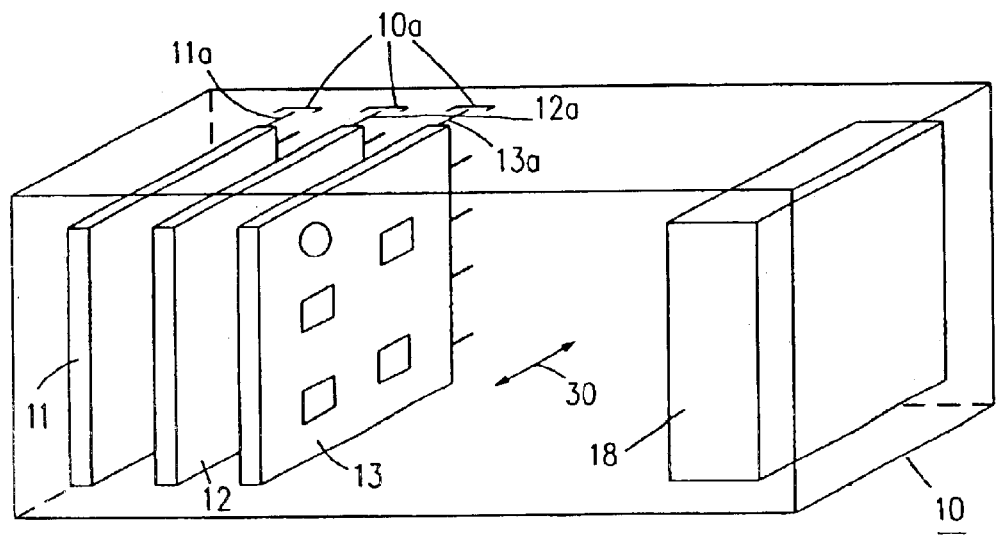
FIG. 2 is a perspective elevational view of an arrangement implemented as a production box with units which can be slid into the box.

In the perspective view shown in FIG. 2, the production unit 10 is implemented as a cabinet-shaped production box which can accommodate the picture signal-processing devices 11 to 17 as units which are slidable into the box in the direction 30. FIG. 2 shows three slide-in units 11, 12 and 13 of this type. At their rear side, the slide-in units 11 to 13 have slide-in contacts 11a, 12a, 13a which contact fixed countercontacts 10a when they are slid into the box and are thus contacted with the controllable switching device 18. The controllable switching device 18 may also be implemented as a slide-in unit.

Figure 4:
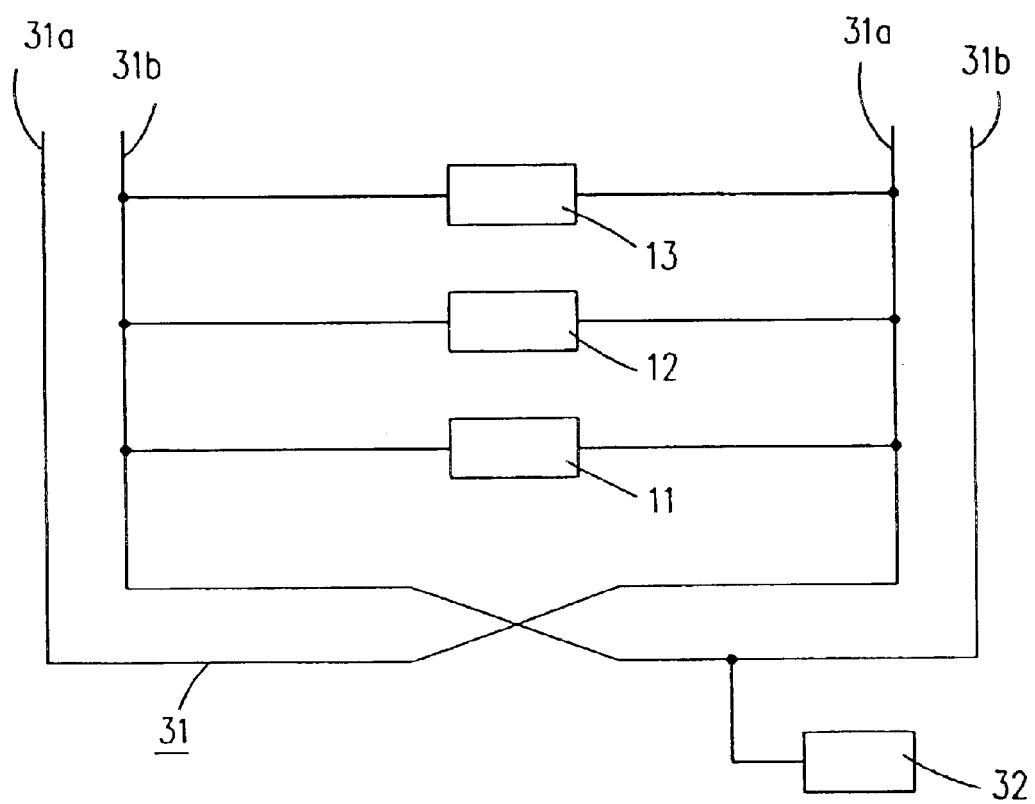
FIG. 4 shows a computer-controlled crossbar.

FIG. 4 is a circuit diagram of a computer-controlled crossbar 31 with inputs 31a and outputs 31b and with three picture signal-processing devices 10, 11 and 12 connected to the inputs and outputs. The reference numeral 32 denotes operating devices.

What is claimed is:

1. An arrangement for producing television contributions in a studio or in a mobile unit, comprising:

at least one picture signal source;

devices for processing the picture signals; and outputs for the processed picture signals, characterized in that the arrangement further comprises:

a central operation unit for accommodating the individual picture signal-processing devices as independent units; and a controllable switching device having outputs connected to the inputs of the picture signal-processing devices, and having inputs connected to the outputs of the picture signal-processing devices enabling free allocation of the picture signal-processing devices to the at least one picture signal source and to the outputs of the arrangement.

2. An arrangement as claimed in claim 1, characterized in that said the controllable switching device is controllable by means of control software.

3. An arrangement as claimed in claim 1, characterized in that controllable switching device comprises a computer-controlled crossbar having outputs and inputs to which the inputs and outputs, respectively, of the picture signal-processing devices are connected.

4. An arrangement as claimed in claim 1, characterized in that central operation unit comprises a production box arranged centrally in a studio or a mobile unit, the picture signal-processing devices and the controllable switching device being accommodated in said production box.

5. An arrangement as claimed in claim 4, characterized in that the picture signal-processing devices are implemented as fixedly wired slide-in units which are slidable into the production box and are connectable to the controllable switching device via slide-in contacts or software modules.

6. An arrangement as claimed in claim 1, characterized in that said arrangement further comprises one or more control desks having freely configurable control surfaces for controlling the picture signal-processing devices selected for a given purpose by means of the controllable switching device.

* * * * *